United States Patent [19]

Rothfleisch

[11] Patent Number: 5,551,255

[45] Date of Patent: Sep. 3, 1996

[54] ACCUMULATOR DISTILLATION INSERT FOR ZEOTROPIC REFRIGERANT MIXTURES

[75] Inventor: Peter I. Rothfleisch, Gaithersburg, Md.

[73] Assignee: The United States of America as represented by the Secretary of Commerce, Washington, D.C.

[21] Appl. No.: 312,636

[22] Filed: Sep. 27, 1994

[51] Int. Cl.$^6$ ..................................................... F25B 1/00
[52] U.S. Cl. ................................. 62/502; 62/114; 62/503
[58] Field of Search ............................ 62/114, 149, 174, 62/502, 503, 113, 513, 83

[56] References Cited

U.S. PATENT DOCUMENTS

| | | | |
|---|---|---|---|
| 2,841,965 | 7/1958 | Etherington | 62/513 |
| 2,867,094 | 1/1959 | Herrick | 62/174 |
| 2,938,362 | 5/1960 | Schwind | 62/149 |
| 2,951,349 | 9/1960 | Etherington | 62/149 |
| 2,951,350 | 9/1960 | Etherington et al. | 62/149 |
| 4,179,898 | 12/1979 | Vakil | 62/114 |
| 4,217,760 | 8/1980 | Vakil et al. | 62/114 |
| 4,217,765 | 8/1980 | Ecker | 62/503 |
| 4,218,890 | 8/1980 | Vakil et al. | 62/114 |
| 4,283,919 | 8/1981 | Vakil | 62/114 |
| 4,354,362 | 10/1982 | Schumacher et al. | 62/503 X |
| 4,429,544 | 2/1984 | McCarty | 62/503 X |
| 4,580,415 | 4/1986 | Sakuma et al. | 62/502 |
| 4,722,195 | 2/1988 | Suzuki et al. | 62/149 |
| 4,781,738 | 11/1988 | Fujiwara et al. | 62/18 |
| 4,840,042 | 6/1989 | Ikoma et al. | 62/324.1 |
| 4,942,743 | 7/1990 | Gregory | 62/503 |
| 4,987,751 | 1/1991 | Lowen | 62/502 |
| 5,012,651 | 5/1991 | Nakatani et al. | 62/149 |

FOREIGN PATENT DOCUMENTS

| | | |
|---|---|---|
| 2-64364 | 3/1990 | Japan . |
| 2-64367 | 3/1990 | Japan . |
| 2-64370 | 3/1990 | Japan . |
| 2-64369 | 3/1990 | Japan . |
| 2-64368 | 3/1990 | Japan . |
| 846937 | 7/1981 | U.S.S.R. . |
| 907360 | 2/1982 | U.S.S.R. . |

Primary Examiner—Harry B. Tanner
Attorney, Agent, or Firm—Ajay A. Jagtiani

[57] ABSTRACT

An accumulator distillation insert is provided for allowing the composition of a zeotropic refrigerant to be adjusted based upon a building heat load. The accumulator distillation insert comprises an accumulator, the accumulator having a two-phase input and a vapor output, the accumulator having a refrigerant mixture, in liquid form, disposed at a bottom of the accumulator; an immersion heater is provided in communication with the refrigerant mixture, in liquid form; and a distillation column is disposed in the accumulator, the distillation column is maintained above the refrigerant mixture in liquid form, the distillation column is provided for changing the chemical composition of the refrigerant mixture by decreasing the amount of volatile components in the refrigerant mixture, stored in the accumulator and thereby increasing the capacity of the heat pump system.

18 Claims, 4 Drawing Sheets

ACCUMULATOR DISTILLATION INSERT FOR ZEOTROPIC REFRIGERANT MIXTURES

BACKGROUND OF THE INVENTION

1. Field of the Invention

The present invention relates generally to a system for varying the capacity of a heat pump to match building loads as outdoor temperature drops, and more particularly to a system which modulates heat pump capacity to reduce auxiliary energy usage by controlling the composition of a zeotropic refrigerant mixture.

2. Description of the Prior Art

The heating capacity of a single speed air-to-air heat pump is directly proportional to the outside (evaporator) temperature. As the outside temperature falls, the suction pressure and temperature also fall. This causes both the suction vapor specific volume and compression ratio to increase. System heating capacity is thereby reduced and specific compressor work input is increased. Building heat load, on the other hand, is directly proportional to the temperature difference between indoor and outdoor air. Consequently, building heat load increases as outside temperature falls.

Building heat load 10 and system capacity 12 are plotted as functions of outside temperature in FIG. 1. The outside temperature at which building load equals system capacity is referred to as a balance point 14. If outdoor temperature is below balance point 14, system capacity will be insufficient to satisfy the heating needs of the structure. In order to maintain indoor temperature, system capacity will have to be supplemented by an auxiliary energy source 16.

The auxiliary energy required for an entire heating season is the difference between seasonal building load and seasonal heat pump capacity output below balance point 14. Auxiliary energy is usually supplied by electric resistance heating, which has a Coefficient of Performance (COP) of one. Since the COP of a heat pump is usually greater than one, the Heating Seasonal Performance Factor (HSPF) may be increased by reducing the auxiliary heat 16 required. Although the increase in HSPF is usually modest (depending on the climatic region), the reduction in peak load to the electric utility may be significant. The benefits of a reduced peak energy demand may be magnified if the electric power plant uses a less efficient electric generation system to meet peak demand.

To reduce the amount of auxiliary heat 16 required, heat pump capacity must be increased to match building load as outside temperature falls. The only commercially available heat pumps capable of matching system capacity to building load have been those which vary the volumetric capacity of a compressor. This volumetric capacity variation may be accomplished in several ways; the most common methods are two-speed compressor motors and frequency inverters for variable speed compressor motors.

The system capacity may also be controlled by varying the composition of a zeotropic refrigerant mixture. Specifically, by controlling mixture composition, the thermodynamic properties of the refrigerant mixture may be altered to increase system capacity as outside temperature drops. Although shifting the composition of a zeotropic mixture may be thought of as a chemical analogue to a variable displacement compressor, the two methods are not mutually exclusive.

The effects of increasing heat pump capacity to match building load are shown for a single speed system capable of shifting the composition of a zeotropic refrigerant mixture in FIG. 2. In FIG. 2, it is assumed that the heat pump would operate on the original refrigerant mixture until outdoor temperature falls to the balance point. FIG. 2 shows that the result of increasing the capacity below the balance point will be a reduced auxiliary energy requirement and an increase in the HSPF.

The capacity increase which may be achieved by changing the composition of a zeotropic refrigerant mixture has been demonstrated by many investigators. However, none of these proposed systems have proven to be commercially viable because they have either failed to produce significant composition shifts or the hardware cost and control complexities have been prohibitive. It is the purpose of this invention to provide a significant composition shift while taking advantage of the natural tendencies of heat pump operation so that system control is not overly complicated.

The prior art discloses many different types of proposed methods and systems for controlling the capacity of a heat pump by changing the composition of a zeotropic mixture. All of these may be classified into the two generic categories: (1) those that use distillation columns and (2) those that use accumulators. Generally, the accumulator methods are simple to implement but require a large refrigerant charge. Additionally, the theoretical maximum refrigerant composition change is limited to the difference between the original charged composition and the vapor composition that is in thermal equilibrium with the original mixtures bubble point. It will be shown that for accumulator systems to achieve their theoretical maximum composition change they must store all but an infinitesimal portion of the total refrigerant charge. However, it is impractical to construct a system that stores such a large percentage of the total refrigerant charge.

Conversely, column methods may achieve much larger composition changes at the cost of increased system complexity in terms of both hardware and control. Many of these proposed systems have been so complex that they would never be cost effective enough to be applied in the competitive residential heat pump market.

As a typical example of the prior art in the systems employing accumulators consider the U.S. Pat. Nos. 4,179,898 (Vakil), 4,217,760 (Vakil et al.), 4,218,890 (Vakil et al.), and 4,283,919 (Vakil). These patents disclose systems which shift the composition of the zeotropic mixture by regulating the liquid level in the low pressure accumulator. Since these vessels have a minimum of heat transfer at the surface, the entire vessel will be in an approximate state of thermal equilibrium.

A Temperature-Composition diagram for a zeotropic mixture of R32/R134a is shown in FIG. 3. In FIG. 3, thermal equilibrium means that vapor leaving the accumulator and the liquid remaining must lie on a horizontal tie line. Additionally, species conservation dictates that one point on the tie line must be concurrent with the vertical line defined by the original charged composition. The two limiting tie lines dictated by species conservation are shown in FIG. 3. It is theoretically possible for the system to operate so that the equilibrium state in the low pressure accumulator is represented by any tie line that lies between these two tie lines. Maximum system capacity will occur when circulating fluid, represented by vapor leaving the accumulator, has the greatest composition of the more volatile component. This vapor composition is defined by the tie line that extends from the original composition bubble point.

Although it is theoretically possible for an accumulator storage system to operate so that the circulating composition is that of the vapor in equilibrium with the bubble point, it is not feasible in practice. Since the liquid remaining in the accumulator and the vapor leaving must lie on the same tie line, as the composition of the more volatile component increases in the vapor it also increases in the stored liquid. Consequently, as the maximum capacity composition is approached increasingly larger percentages of the refrigerant charge will have to be stored in the accumulator. It is impractical to store large percentages of the total refrigerant charge because the excess refrigerant will have to be accommodated in the cooling mode when the low pressure accumulator is empty. As in the case of the above patents proposed by Vakil, a high-side receiver must be added to accommodate this excess refrigerant. An additional problem of accumulator systems is that the total refrigerant charge will have to be very large. A large refrigerant charge is undesirable for economic and environmental reasons.

Turning now to the use of distillation columns in systems, several typical examples of these systems are discussed below. U.S. Pat. No. 4,781,348, by Fujiwara et al., discloses a specific configuration for a distillation column (referred to as a liquid-gas contactor) and a specific configuration for a refrigeration cycle to incorporate the liquid-gas contactor. The refrigeration cycle that incorporates this liquid-gas contactor disclosed in this patent: 1) is such that the distillation column must handle the entire system mass flow, instead of handing only the liquid phase of the evaporator overfeed refrigerant; and 2) the liquid-gas contactor is located between two partial expansions that comprise the total expansion pressure drop of the system. This linkage between liquid-gas contactor and the expansion process complicates the control of the system. Finally, as the Fujiwara et al. system is configured, the system requires a cooler to liquify the vapor leaving the top of the liquid-gas contactor. In practice, the rate of heat removal and temperature level in the cooler is difficult to control and thus generates additional control problems.

U.S. Pat. No. 5,012,651, by Nakatani et al., discloses a heat pump apparatus which incorporates a fractioning/separating device (distillation column) with a reservoir and heat source. Because of the location of the fractioning/separating device, this system requires more than just a heater to control the operation of the fractionator. In all of the various embodiments shown in FIGS. 1 through 9, a valve is required to meter the flow of refrigerant from the reservoir to the heat source coil. Additionally, various complex variations of the Nakatani et al. system are necessary to allow the fractioning device to be functional in both the heating and cooling modes.

U.S. Pat. No. 4,840,042 (by Ikoma et al.); and Japanese Patents 2-64,364 (by Ikoma); 2-64,367 (by Ikoma); 2-64,368 (by Nakatani); 2-64,369 (by Ikoma); and 2-64,370 (by Ikoma) are all essentially the same as U.S. Pat. No. 5,012,651, described above, except for the introduction of the suction ejector to remove vapor from the top of the distillation column. Essentially, they all incorporate a distillation or fractionating device into the heat pump by merging an entirely separate ancillary system.

Soviet Union Patents 907,360 and 846,937, while related to refrigerating systems, do not describe vapor compression refrigeration systems as they contain no compressor. The pressure difference is established by liquid pumps and they contain no distillation column or fractionating device of any kind. The refrigerant composition differences are established by separation of partially evaporated refrigerant streams.

U.S. Pat. No. 4,722,195, by Suzuki et at., discloses a heat pump system equipped with a distillation column to vary the composition of a zeotropic refrigerant mixture in both the heating and cooling modes. This patent is essentially the same as U.S. Pat. No. 4,781,738, described above. The only difference is that the distillation column, with its two partial expansions, is now placed in a refrigerant flow circuit parallel to the main expansion process. This modification enables the system to theoretically function in both the heating and cooling modes.

U.S. Pat. No. 4,580,415, by Sakuma et al., discloses a refrigeration system designed to produce a rapid freezing mode for temporary ultra-low temperature operation. It should be appreciated that this system is not intended for a residential heat pumping application. Additionally, the system stores the low boiling point refrigerant R13 in the vapor phase on the high pressure side of the system.

Other patents of interest include: U.S. Pat. Nos. 2,938,362, by Schwind; 2,867,094, by Alpaus; 2,951,350, by Etherington et al.; 4,987,751, by Lewen; 2,841,965 by Etherington; and 2,951,349, by Etherington.

In all of the prior art, discussed above, the distillation of the zeotropic refrigerant mixture is accomplished in a manner that requires significant changes in the basic refrigeration cycle and hardware. Applicant's proposed system does not require any changes in the basic refrigeration cycle and adds no additional moving parts or valves. Consequently, the system hardware and control methods remain in their original simple form.

SUMMARY OF THE INVENTION

The purpose of this invention is to provide a means to vary the heat pump capacity to match the building load as the outdoor temperature drops.

One of the most basic facts about residential heat pump systems is that they operate under a partial load condition most of the time. The complexity of the prior art in distillation heat pump systems severely complicates the operation of the column during partial load operation. The failing of all the prior art is that the designers have not considered how to integrate the distillation column with the natural tendencies of heat pump operation. The placement of the distillation column inside the suction accumulator, as proposed in this invention, adds no additional complexity to the system because it is completely integrated with the basic heat pump cycle and overcomes the failing of the prior art.

Another benefit of placing the distillation column inside the suction accumulator is that it allows the distillation column to be designed to handle a small portion of the total system mass flow. Inside the suction accumulator, the distillation column must only handle an amount of liquid reflux equal to the amount of unevaporated refrigerant leaving the evaporator or heat source coil. Consequently, the distillation column diameter may remain small even for a large tonnage system.

Another advantage of the proposed invention is that the column and immersion heater or alternate embodiment heat source helps to overcome the cyclic losses caused by a start-up accumulator dump. At system start-up, a heat pump equipped with a fixed area expansion device dumps most of the charge into the accumulator. In a traditional system or a prior art distillation system equipped with a standard suction accumulator, the accumulator dump causes the system to temporarily operate at low capacity because of the shortage of refrigerant in the rest of the system. However, the accumulator distillation insert of the present invention will produce its most rapid distillation during the accumulator dump since the column will be given a large amount of reflux liquid. This will rapidly enrich the circulating refrigerant in the more volatile component, thereby raising system capacity and reducing start-up capacity loss.

It is therefore an object of the present invention to provide a system which modulates system capacity to reduce auxiliary energy usage by controlling the composition of a zeotropic refrigerant mixture.

It is a further object to provide a system which retains the simplicity of an accumulator storage system, but eliminates the need to store large percentages of the refrigerant charge.

It is yet another object to provide a system in which the maximum composition shift is not limited to the vapor composition in equilibrium with the bubble point of the initial composition.

It is yet another object to provide a system which is superior in terms of hardware complexity, cost, system control, and magnitude of composition shift.

In all of the above embodiments, it is an object to provide a system which utilizes the standard components of a typical residential heat pump so that the composition shift may be accomplished in a simple and cost effective manner by placing a distillation column inside a suction accumulator.

Finally, it is an object of the invention to provide a system in which the reduction of auxiliary energy usage will cause a decrease in peak load requirement of the electric utility and an increase in the system Heating Seasonal Performance Factor (HSPF).

According to one broad aspect of the present invention, there is provided an accumulator distillation insert for a heat pump system. The insert comprises: an accumulator, the accumulator having a two-phase input and a vapor output, the accumulator having a refrigerant mixture, in liquid form, disposed at a bottom of the accumulator; a heating means is provided in communication with the refrigerant mixture, in liquid form; and a distillation column is disposed in the accumulator, the distillation column is maintained above the refrigerant mixture in liquid form, the distillation column is provided for changing the chemical composition of the refrigerant mixture by decreasing the amount of volatile components in the refrigerant mixture, stored in the accumulator and thereby increasing the capacity of the heat pump system.

According to another broad aspect of the invention, there is provided a heat pump system for dynamically adjusting a refrigerant mixture based upon a building heat load. The heat pump system comprises: an accumulator, the accumulator having a two-phase input line and a vapor output line, the accumulator having a refrigerant mixture, in liquid form, disposed at a bottom of the accumulator; a compressor in fluid communication with the accumulator via the vapor output line; a reversing valve in communication with the compressor, the reversing valve also in communication with the accumulator via the two-phase input line; a first coil in communication with the reversing valve via a first conduit; a second coil in communication with the first coil via a second conduit and in communication with the reversing valve via a third conduit; a heating means provided in communication with the refrigerant mixture; and a distillation column disposed in the accumulator, the distillation column provided for changing the chemical composition of the refrigerant mixture by decreasing the amount of volatile components in the refrigerant mixture stored in the accumulator and thereby increasing the capacity of the heat pump system.

Other objects and features of the present invention will be apparent from the following detailed description of the preferred embodiment.

BRIEF DESCRIPTION OF THE DRAWINGS

The invention will be further described in conjunction with the accompanying drawings, in which:

FIG. 3 is a temperature-composition diagram for a zeotropic mixture of R32/R134a;

DETAILED DESCRIPTION OF THE PREFERRED EMBODIMENT

Figure 6:
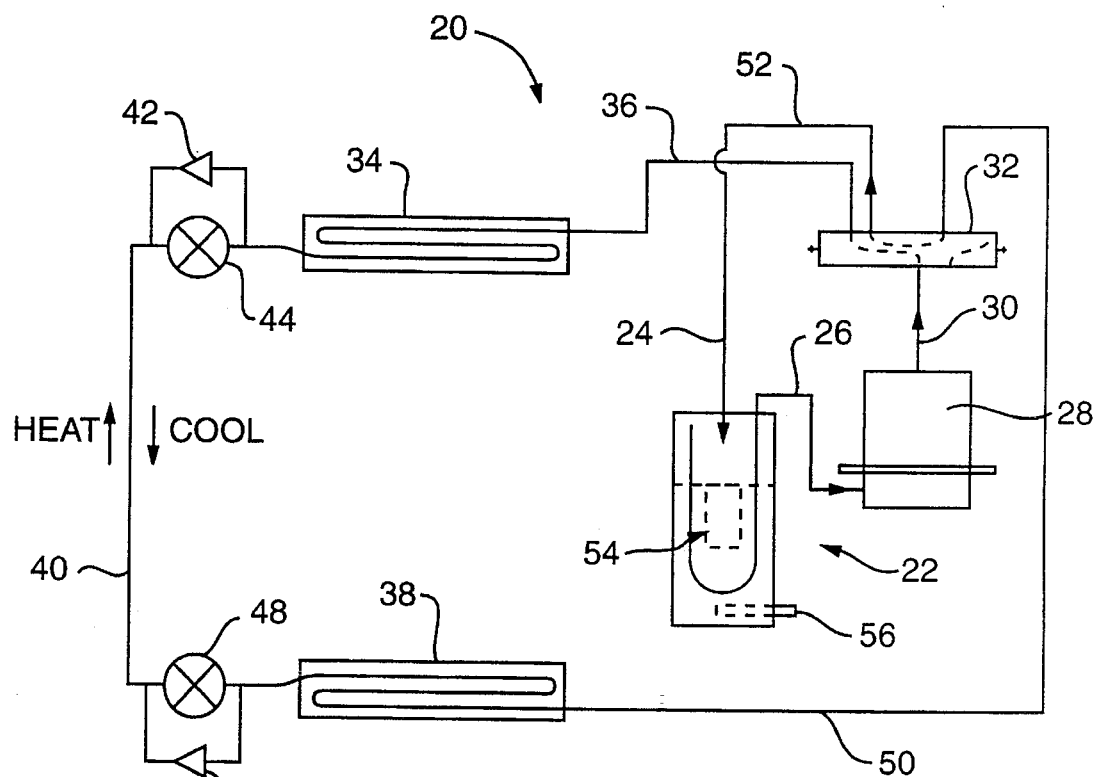
FIG. 6 is a block diagram of a heating/cooling system utilizing the accumulator of FIG. 5 and constructed in accordance with a preferred embodiment of the invention.

With reference to the Figures, wherein like reference characters indicate like elements throughout the several views and, in particular, with reference to FIG. 6, a heat pump system 20, constructed in accordance with a preferred embodiment, is illustrated. As may be seen, an accumulator 22 is provided with a two-phase input 24 and a vapor output 26 lines. Vapor output line 26 is in communication with a compressor 28. Compressor 28 has a vapor output line 30 which provides fluid communication between compressor 28 and reversing valve 32. Valve 32 is in fluid communication with an outdoor coil 34 via conduit 36. Outdoor coil 34 is in communication with an indoor coil 38 via conduit 40. Disposed at a proximal end of conduit 40 is a check valve 42 and an expansion device 44. It should be appreciated that check valve 42 and expansion device 44 are maintained in a parallel configuration with respect to each other. Disposed at a distal end of conduit 40 is a check valve 46 and an expansion device 48. It should be appreciated that check valve 46 and expansion device 48 are maintained in a parallel configuration with respect to each other and that check valves 42 and 46 have opposite orientations. Communication between indoor coil 38 and reversing valve 32 is provided by conduit 50. Finally, conduit 52 provides communication between reversing valve 32 and the two-phase input 24 of accumulator 22. It should be appreciated that the above elements are commercially available.

To thoroughly explain the function of a suction accumulator, some background information is necessary. First consider the fact that liquids are for all practical purposes incompressible. Therefore, refrigeration compressors, which are designed to compress vapor only, will not tolerate liquid in any appreciable amount. If enough liquid enters the compression cylinder, serious damage to the compressors internal components will occur. Excess liquid entering the compressor may also destroy a compressor over time because the liquid tends to wash the compressor oil off of the compressor bearing surfaces.

The primary function of a suction accumulator is to protect the compressor from damage due to the sudden return of liquid through the suction line. If a large amount of liquid suddenly returns through the suction line, such as on system startup, the accumulator will prevent the liquid from reaching the compressor. The surge of liquid will remain in the accumulator where it will be slowly metered back to the compressor through the oil return orifice at a rate that will not damage the compressor. The oil return orifice is located at the bottom of the accumulator to insure that all of the refrigerant and oil that enters the accumulator can eventually be brought back to the compressor. The oil return orifice is absolutely necessary for the return of oil. Unlike the refrigerant, the oil will not vaporize and would otherwise eventually fill the accumulator, thereby depriving the compressor of oil.

Figure 5:
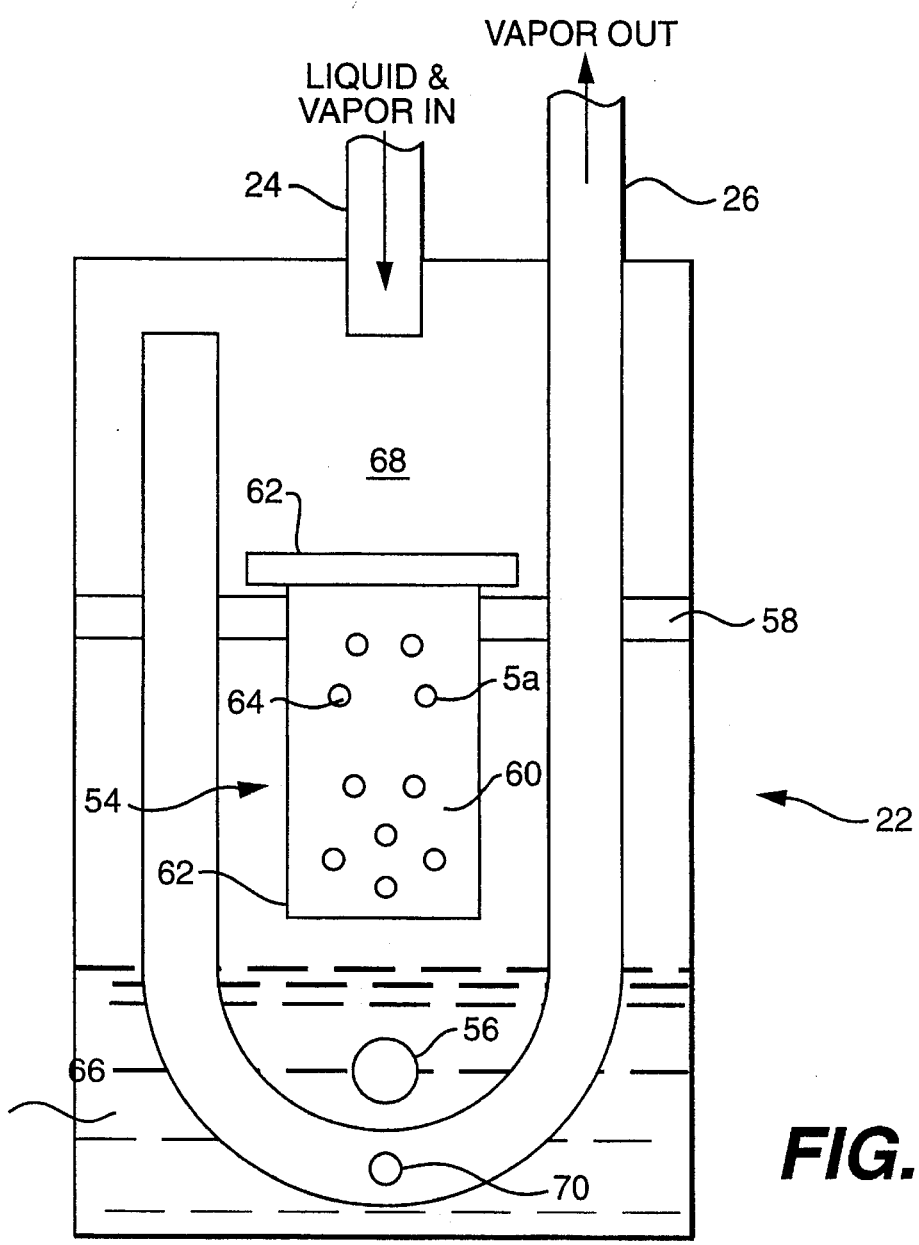
FIG. 5 is a cross sectional view of an accumulator constructed in accordance with a preferred embodiment of the invention.
Figure 5A:
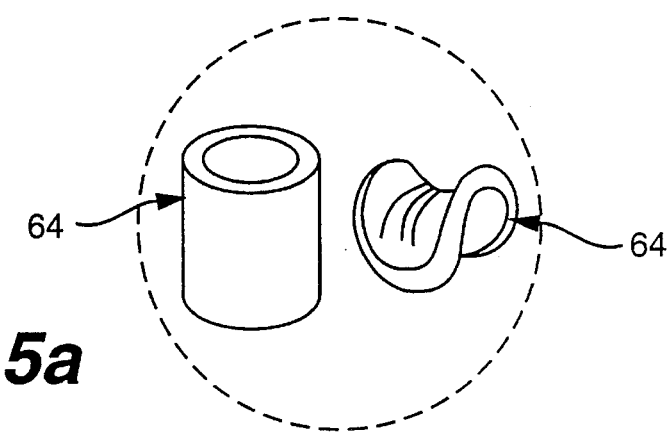
FIG. 5a is a perspective view of a Rashing ring and a berl saddle, which may be utilized in the accumulator of FIG. 5.

The invention consists of modifying the heat pump system 20, described above, and more particularly suction accumulator 22 by adding a distillation insert 54 and a small immersion heater 56 within accumulator 22. An unmodified suction accumulator 22 may be purchased from Refrigeration Research and may be modified as described below. Turning now to FIG. 5, an enlarged view of accumulator 22, constructed in accordance with a preferred embodiment of the invention, is provided. The components of distillation insert 54 are a liquid barrier 58, a column 60, packing restrainers 62, packing material 64, and immersion heater 56.

Liquid barrier 58 serves three purposes; (1) it supports column 60, (2) provides a separation between stored liquid 66 and a top section 68 of accumulator 22, and (3) it forces all of the incoming liquid from two-phase input 24 to enter column 60. Thus, high boiling point refrigerant in liquid phase is stored on the low pressure side of heat pump system 20. Packing restrainers 62 must restrain packing material 64 in column 60, but not impede the flow of liquid and vapor through column 60. The column design (i.e., height and diameter) and the type of packing (i.e., shape, size and material) will vary with the particular application. Column 60 and packing material 64 design should follow accepted chemical engineering practice with respect to small diameter packed columns. This information may be found in any standard chemical engineering text. In a preferred embodiment, column 60 is constructed from stainless steel. Packing material 64 may be RASCHIG rings, porcelain berl saddles or any other material known in the art and may be purchased from Aldrich Chemicals. The final column design would probably be determined by optimizing the inherent trade-off between manufacturing cost and the column effectiveness as expressed by the number of theoretical plates. It should be appreciated that column 60 has the advantage of handling only the liquid phase of the evaporator overfeed refrigerant, not the entire system mass flow, and thus may be smaller in size than prior art distillation columns. Additionally, the particular positioning of column 60 enables column 60 to be totally separate from a conventional system expansion process.

Immersion heater 56 is capable of controlling the composition of the stored liquid 66 by regulating the liquid temperature. It should be appreciated that heater 56 may be automatically controlled in response to changes in any relevant system variable such as outdoor temperature, compressor current draw, expansion device position, accumulator liquid level, accumulator liquid temperature, heater surface temperature, or the difference between indoor temperature and set-point.

Figure 7:
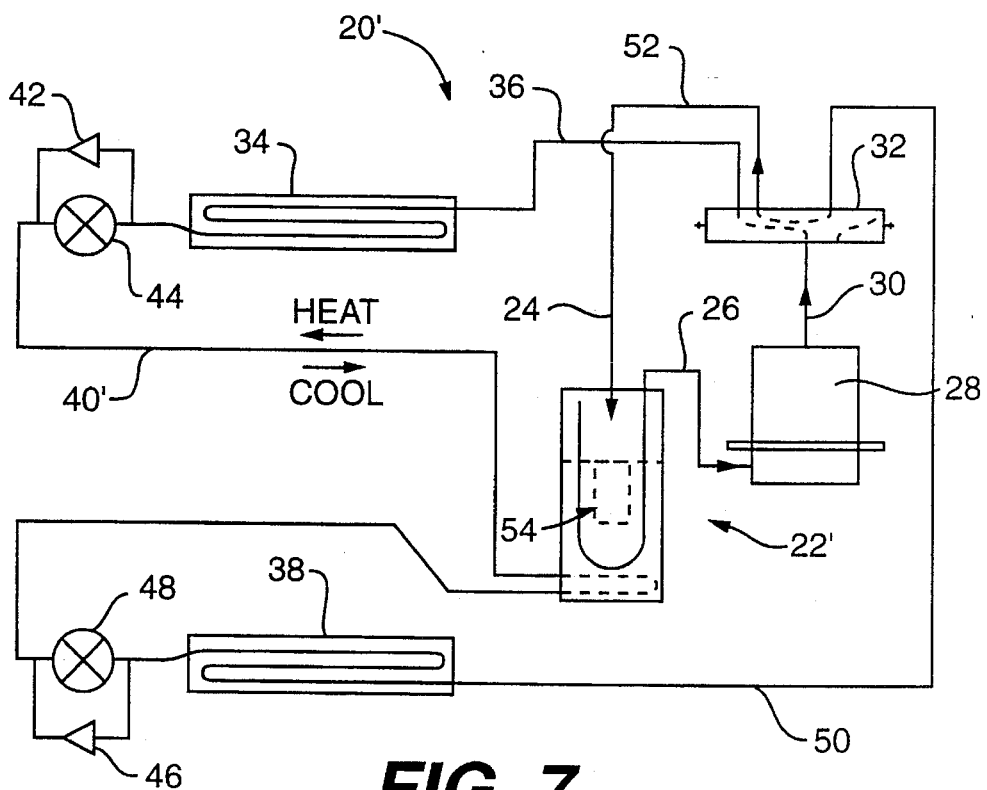
FIG. 7 is a block diagram of a heating/cooling system utilizing the accumulator of FIG. 5 and constructed in accordance with an alternate embodiment of the invention.

To improve the cycle efficiency electric immersion heater 56 may be replaced by heat from the system liquid line as illustrated in FIG. 7. This may be accomplished by routing conduit or line 40' through liquid storage 66 of accumulator 22'. This modification will reduce the consumption of a parasitic electrical power and produce a gain in thermodynamic efficiency by subcooling the high-pressure liquid prior to expansion.

The ability to store liquid of any desired purity in accumulator 22 requires that the stored liquid 66 and leaving vapor not be in thermal equilibrium. Distillation insert 54 and immersion heater 56 allow this to occur without impeding any of the normal functions of suction accumulator 22 (i.e., compressor protection from liquid slugging, limitation of the discharge temperature, and oil return orifice 70).

Figure 1:
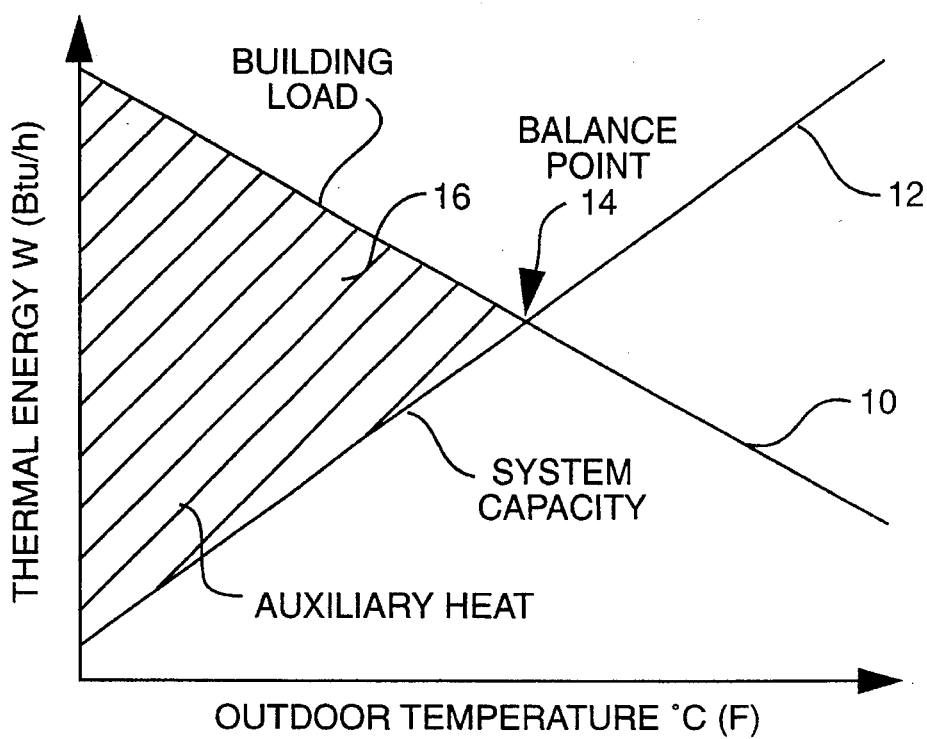
FIG. 1 is a heating mode graph of a single speed heating/cooling system which compares outdoor temperature versus the thermal energy required by the building and the thermal output of the system in a prior art heating system.
Figure 2:
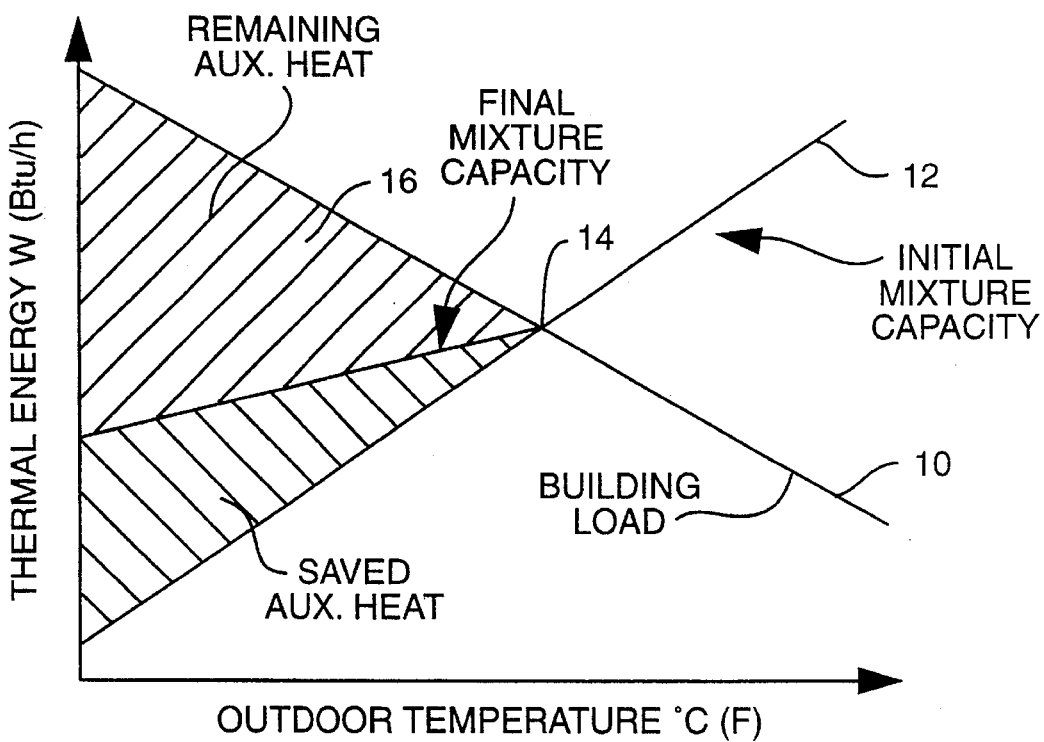
FIG. 2 is a graph of a single speed heating/cooling system which compares outdoor temperature versus thermal energy where the composition of a zeotropic refrigerant mixture is shifted.
Figure 3:
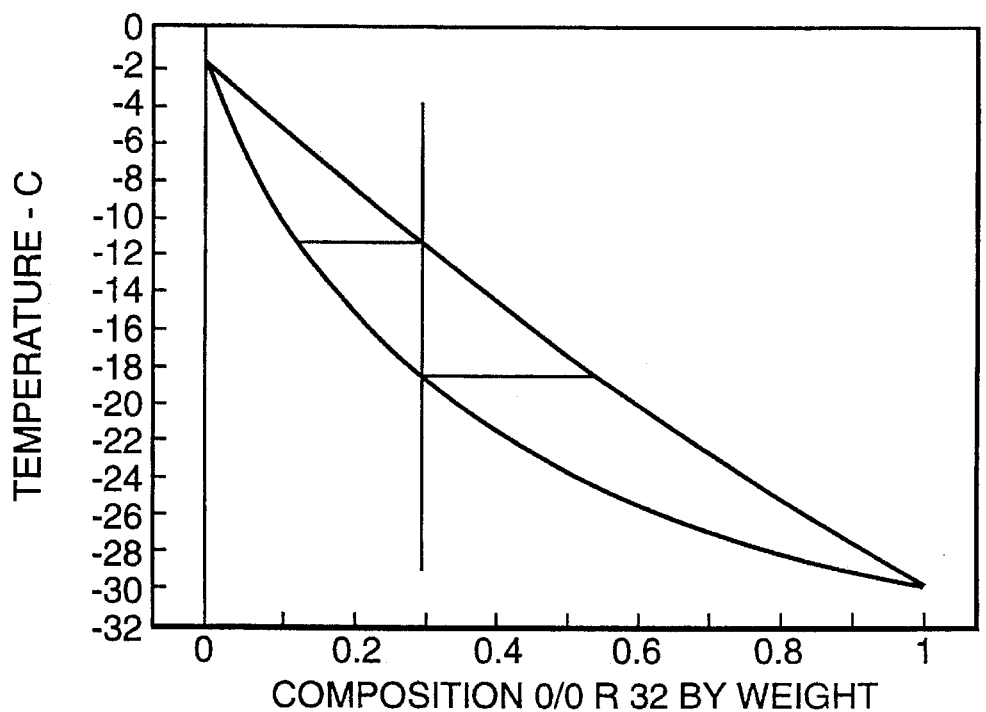
Figure 4:
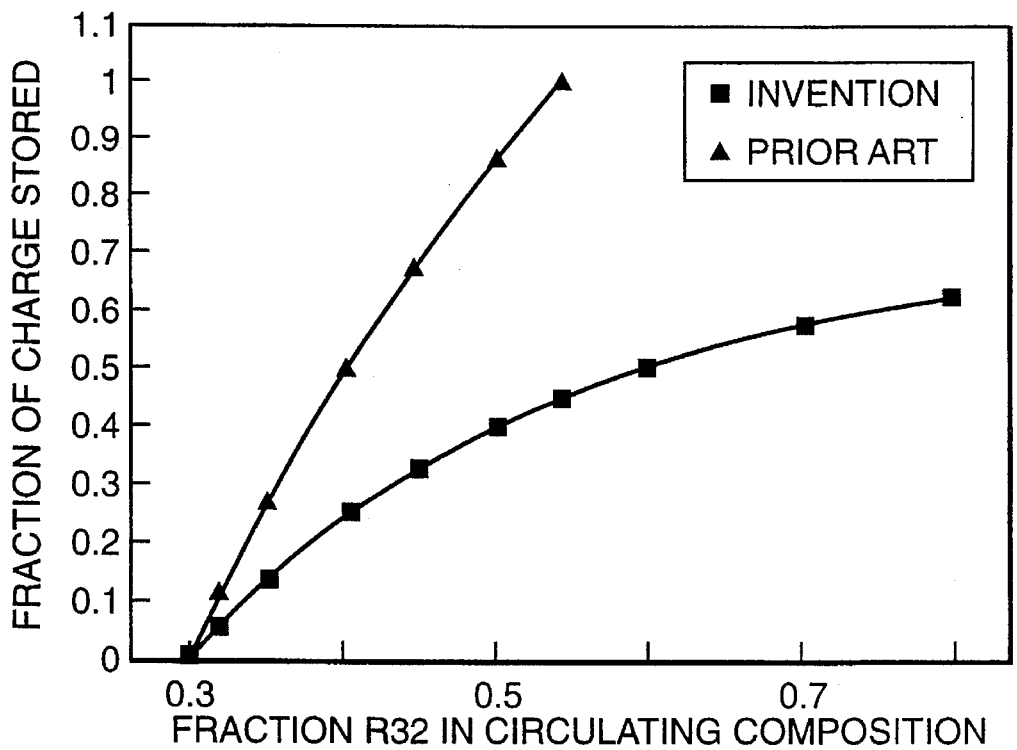
FIG. 4 is a graph which compares the storage requirements of zeotropic refrigerant in prior art accumulator storage systems with that of the system constructed in accordance with a preferred embodiment of the invention.

By modifying accumulator 22 in this manner, the need to store large percentages of refrigerant charge is eliminated. Additionally, the maximum composition shift is not limited to the vapor composition in equilibrium with the bubble point of the initial composition. The invention achieves this result by removing the thermal equilibrium constraint found in prior art accumulator storage systems. Since the stored liquid and the leaving vapor are not in thermal equilibrium they no longer must lie on the same tie line. Consequently, the stored liquid may consist of the less volatile component in a nearly pure composition. FIG. 4 compares the storage requirements of the invention to the prior art of accumulator systems for a zeotropic mixture of 30% R32 and 70% R134a by weight in a preferred embodiment. The invention allows the circulating percentage of R32 to be increased beyond 30% without a significant increase in storage requirements as may be seen in FIG. 4. Clearly, the storage requirements over the prior art have been considerably reduced and the maximum possible composition of R32 in the circulating refrigerant is increased. As may be seen from FIG. 2, the system capacity will be increased. This will produce a reduction in the auxiliary energy required.

It should be appreciated that the invention differs from the prior art systems in that it does not necessitate any changes in the basic heat pump cycle hardware or control. In other words, the novelty of the invention is the placement of distillation column 54, not the existence of the column itself, and its simple integration with typical heat pump operating principles. It should. further be appreciated that the selection of the device may be used with other zeotropic mixtures that are suitable for the particular application.

Operation of Device

A typical operation sequence for a heat pump equipped with an accumulator distillation column insert 54 and a fixed area expansion device will now be described. Consider a heat pump operating under steady state at the balance point with a dry suction accumulator 22. Now allow the outdoor temperature to fall by some finite amount. The system 20 will naturally respond to the change in outdoor temperature by allowing some liquid to flood into suction accumulator 22. Distillation column 54 will allow only the less volatile component to be stored in accumulator 22. The system will eventually reach a new steady state condition where the composition of the circulating refrigerant has been enriched in the more volatile refrigerant component. Because of its greater suction density, the new operating mixture will give a higher capacity than the original mixture would have under the same operating conditions.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An accumulator distillation insert for a heat pump system, said insert comprising:
   an accumulator, said accumulator having a two-phase input and a vapor output, said accumulator having a refrigerant mixture, in liquid form, disposed at a bottom of said accumulator;
   heating means provided in communication with said refrigerant mixture, in liquid form; and
   a distillation column disposed in said accumulator, said distillation column maintained above said refrigerant mixture in liquid form, said distillation column provided for changing the chemical composition of said refrigerant mixture by decreasing the amount of volatile components in said refrigerant mixture stored in said accumulator and thereby increasing the capacity of said heat pump system.

2. The accumulator recited in claim 1 wherein said heating means is an immersion heater.

3. The accumulator recited in claim 1 wherein said heating means is provided by said heat pump.

4. The accumulator recited in claim 1 wherein said volatile component of said refrigerant mixture is R32.

5. The accumulator recited in claim 1 wherein said volatile component is at least 30% by weight of said refrigerant mixture outside of said accumulator.

6. The accumulator recited in claim 1 wherein said refrigerant mixture is a zeotropic mixture.

7. The accumulator recited in claim 1, further comprising a liquid barrier disposed in said accumulator, said liquid barrier for supporting said distillation column; providing a separation between a top portion of said accumulator and said refrigerant mixture, in liquid form, disposed at a bottom of said accumulator; and for forcing all incoming refrigerant entering said liquid and vapor input into said distillation column.

8. The accumulator recited in claim 1, further comprising a packing material disposed in said distillation column.

9. The accumulator recited in claim 8 wherein said packing material is selected from the group consisting of: RASCHIG rings and porcelain berl saddles.

10. A heat pump system for dynamically adjusting a refrigerant mixture based upon the outside temperature, said heat pump system comprising:
    an accumulator, said accumulator having a two-phase vapor input line and a vapor output line, said accumulator having a refrigerant mixture, in liquid form, disposed at a bottom of said accumulator;
    a compressor in fluid communication with said accumulator via said vapor output line;
    a reversing valve in communication with said compressor, said reversing valve also in communication with said accumulator via said liquid and vapor input line;
    a first coil in communication with said reversing valve via a first conduit;
    a second coil in communication with said first coil via a second conduit and in communication with said reversing valve via a third conduit;
    heating means disposed in said accumulator and provided in communication with said refrigerant mixture in said liquid form; and
    a distillation column disposed in said accumulator, said distillation column provided for changing the chemical composition of said refrigerant mixture by decreasing the percentage of more volatile components in said refrigerant mixture stored in said accumulator and thereby increasing the capacity of said heat pump system by increasing the percentage of said more volatile components outside of said accumulator.

11. The heat pump system recited in claim 10, further comprising a first check valve and a first expansion device disposed at a proximal end of said second conduit.

12. The heat pump recited in claim 11 wherein said first check valve and said first expansion device are maintained in a parallel configuration with respect to each other.

13. The heat pump system recited in claim 11, further comprising a second check valve and a second expansion device disposed at a distal end of said second conduit.

14. The heat pump recited in claim 13 wherein said first check valve and said second check valve are orientated in opposite directions with respect to each other.

15. The heat pump recited in claim 13 wherein said second check valve and said second expansion device are maintained in a parallel configuration with respect to each other.

16. The accumulator recited in claim 10 wherein said volatile component of said refrigerant mixture is R32.

17. The accumulator recited in claim 10 wherein said volatile component is at least 30% by weight of said refrigerant mixture outside of said accumulator.

18. The accumulator recited in claim 10, further comprising a liquid barrier disposed in said accumulator, said liquid barrier for supporting said distillation column; providing a separation between a top portion of said accumulator and said liquid refrigerant mixture disposed at a bottom of said accumulator; and for forcing all incoming refrigerant liquid entering said two-phase input into said distillation column.

* * * * *